United States Patent
Koo et al.

(10) Patent No.: US 12,517,988 B2
(45) Date of Patent: Jan. 6, 2026

(54) METHOD AND DEVICE OF EMBEDDING WATERMARK IN SOFTWARE

(71) Applicants: RESEARCH & BUSINESS FOUNDATION SUNGKYUNKWAN UNIVERSITY, Suwon-si (KR); Korea University Research and Business Foundation, Seoul (KR)

(72) Inventors: Hyung Joon Koo, Suwon-si (KR); Sangjin Lee, Seoul (KR); Honggoo Kang, Seoul (KR)

(73) Assignees: Research & Business Foundation Sungkyunkwan University, Suwon-si (KR); Korea University Research and Business Foundation, Seoul (KR)

( * ) Notice: Subject to any disclaimer, the term of this patent is extended or adjusted under 35 U.S.C. 154(b) by 211 days.

(21) Appl. No.: 18/073,876

(22) Filed: Dec. 2, 2022

(65) Prior Publication Data

US 2023/0359712 A1 Nov. 9, 2023

(30) Foreign Application Priority Data

Dec. 2, 2021 (KR) .................. 10-2021-0170916

(51) Int. Cl.
  *G06F 21/16* (2013.01)
  *G06F 8/41* (2018.01)
  *G06F 21/12* (2013.01)

(52) U.S. Cl.
  CPC ............. *G06F 21/16* (2013.01); *G06F 8/41* (2013.01); *G06F 21/125* (2013.01)

(58) Field of Classification Search
  None
  See application file for complete search history.

(56) References Cited

U.S. PATENT DOCUMENTS 5,559,884 A * 9/1996 Davidson ............... G06F 21/16
                                                        713/176
5,790,865 A * 8/1998 Smaalders ........... G06F 9/44557
                                                        714/E11.2

(Continued)

FOREIGN PATENT DOCUMENTS

KR    10-2013-0101651 A    9/2013
KR       10-1408388 B1    6/2014
KR       10-1546776 B1    8/2015

OTHER PUBLICATIONS

Korean Office Action issued on Aug. 27, 2024, in counterpart Korean Patent Application No. 10-2021-0170916 (6 pages in English, 6 pages in Korean).

(Continued)

*Primary Examiner* — Backhean Tiv
(74) *Attorney, Agent, or Firm* — NSIP Law

(57) ABSTRACT

In a software watermarking method according to an embodiment, a watermark is embedded into an executable binary file by compiling a source code to generate the executable binary file and rewriting the executable binary file while reordering two or more functions included in the executable binary file. At the time of compiling the source code, metadata including information related to positions of functions in the executable binary file is generated and included in the binary. The executable binary file is rewritten by reflecting change in positions of the two or more functions using the metadata without recompiling the source code. Information related to the changed function location is stored in a separate ledger.

9 Claims, 7 Drawing Sheets

(56) References Cited

U.S. PATENT DOCUMENTS

| | | | | |
|---|---|---|---|---|
| 6,829,710 | B1* | 12/2004 | Venkatesan | G06F 21/16 |
| | | | | 713/176 |
| 8,045,748 | B2 | 10/2011 | Levy | |
| 8,458,476 | B2* | 6/2013 | Johansson | G06F 21/14 |
| | | | | 726/32 |
| 8,689,200 | B1* | 4/2014 | Tallam | G06F 8/4435 |
| | | | | 717/151 |
| 9,064,099 | B2* | 6/2015 | Horning | G06F 21/14 |
| 10,230,527 | B2* | 3/2019 | Farrell | H04L 9/3239 |
| 11,340,915 | B2* | 5/2022 | Crane | G06F 21/54 |
| 2002/0138748 | A1* | 9/2002 | Hung | G06F 21/64 |
| | | | | 713/190 |
| 2005/0028148 | A1* | 2/2005 | Civlin | G06F 9/45516 |
| | | | | 717/145 |
| 2005/0262490 | A1* | 11/2005 | Thomborson | G06F 21/125 |
| | | | | 717/145 |
| 2006/0259900 | A1* | 11/2006 | Vernon | G06F 21/16 |
| | | | | 717/140 |
| 2008/0127078 | A1* | 5/2008 | Nam | G06F 9/44521 |
| | | | | 717/120 |
| 2009/0100410 | A1* | 4/2009 | Pouliot | G06F 8/75 |
| | | | | 717/122 |
| 2010/0088688 | A1* | 4/2010 | Edwards | G06F 8/54 |
| | | | | 711/E12.001 |
| 2010/0095376 | A1* | 4/2010 | Rodriguez | G06F 21/16 |
| | | | | 718/100 |
| 2013/0232343 | A1* | 9/2013 | Horning | G06F 21/125 |
| | | | | 713/190 |
| 2014/0165210 | A1* | 6/2014 | Collberg | G06F 21/16 |
| | | | | 726/26 |
| 2018/0081826 | A1* | 3/2018 | Gounares | G06F 21/14 |
| 2019/0180003 | A1* | 6/2019 | Schultz | G06F 16/1748 |
| 2021/0157612 | A1* | 5/2021 | Crane | G06F 9/54 |
| 2023/0359712 | A1* | 11/2023 | Koo | G06F 21/14 |

OTHER PUBLICATIONS

A. Fionov, "Digital Watermarks for C/C++ Programs," *Proceedings of the 7th Conference of Finnish-Russian University Cooperation in Telecommunications* (*FRUCT*), 2010, pp. 30-36, plus 2-page attachment with conference information, conference held Apr. 26-30, 2010, St. Petersburg, Russia.

H. Koo, Y. Chen, L. Lu, V.P. Kemerlis, and M. Polychronakis, "Compiler-assisted Code Randomization," *Proceedings of the 2018 IEEE Symposium on Security and Privacy* (*SP 2018*), 2018, pp. 461-477, conference held May 20-24, 2018, San Francisco, California.

Korean Office Action issued on Feb. 5, 2024, in counterpart Korean Patent Application No. 10-2021-0170916 (7 pages in English, 7 pages in Korean).

* cited by examiner

FIG. 7

| Program Name | Size (KB) | SoftMark | | Davidson-Myhrvold | |
|---|---|---|---|---|---|
| | | Functions | Bits | Basic Blocks | Bits |
| 400.perlbench | 1,423 | 895 | 7,491 | 683 | 5,451 |
| 403.gcc | 3,728 | 2,206 | 21,326 | 534 | 4,073 |
| 433.milc | 148 | 88 | 446 | 20 | 61 |
| 445.gobmk | 3,923 | 857 | 7,119 | 135 | 765 |
| 456.hmmer | 339 | 237 | 1,532 | 46 | 191 |
| 458.sjeng | 156 | 78 | 382 | 74 | 357 |
| 464.h264ref | 685 | 259 | 1,708 | 160 | 945 |
| 482.sphinx3 | 210 | 155 | 909 | 20 | 61 |
| addr2line | 1,180 | 704 | 5,649 | 142 | 815 |
| ar | 1,213 | 739 | 5,982 | 142 | 815 |
| bfdtest1 | 1,165 | 686 | 5,479 | 142 | 815 |
| cxxfilt | 1,179 | 705 | 5,659 | 142 | 815 |
| nm-new | 1,195 | 721 | 5,810 | 142 | 815 |
| objcopy | 1,410 | 867 | 7,217 | 181 | 1,101 |
| objdump | 2,474 | 988 | 8,409 | 186 | 1,139 |
| ranlib | 1,213 | 739 | 5,982 | 142 | 815 |
| size | 1,180 | 708 | 5,687 | 142 | 815 |
| strings | 1,180 | 705 | 5,659 | 142 | 815 |
| strip-new | 1,410 | 867 | 7,217 | 181 | 1,101 |
| ctags | 1,495 | 1,150 | 10,039 | 178 | 1,078 |
| lighttpd | 195 | 136 | 772 | 85 | 426 |
| vsftpd | 118 | 143 | 822 | 87 | 439 |
| pscp | 713 | 664 | 5,273 | 99 | 518 |
| psftp | 722 | 671 | 5,338 | 99 | 518 |
| puttygen | 391 | 328 | 2,273 | 144 | 829 |
| cgtest | 405 | 335 | 2,332 | 141 | 808 | nm-new objdump

METHOD AND DEVICE OF EMBEDDING WATERMARK IN SOFTWARE

CROSS-REFERENCE TO RELATED APPLICATIONS

This application claims the benefit under 35 U.S.C. § 119(a) of Korean Patent Application No. 10-2021-0170916 filed on Dec. 2, 2021, in the Korean Intellectual Property Office, the entire disclosure of which is incorporated herein by reference for all purposes.

TECHNOLOGY FIELD

The specification relates to a method and device of embedding a watermark in software.

THE TECHNOLOGY BEHIND THE INVENTION

Current digital products are trivial to be duplicated, increasing concerns about copyright infringement. In particular, in the case of software that is expensive to produce and maintain, damage due to illegal copying is increasing.

Software watermarking is one of widely adopted technologies that can identify the ownership of licensed software by invisibly embedding and extracting digital fingerprints within either source codes or executable codes of a program. Software watermarking devices or software can be divided into an embedder that embeds information into an original program and an extractor that extracts original information from the program.

Unlike watermarking of general digital media such as images or videos, ideal software watermarking needs to be able to preserve the meaning of the original code after embedding a watermark and to satisfy main properties such as credibility, resiliency, spread, watermark embedding capacity, imperceptibility, and efficiency.

Here, credibility represents whether the owner of software can be identified when a watermark is actually present, resiliency represents how easily a watermark can be disrupted or invalidated against attacks such as arbitrary addition, deletion, alteration, and the like, spread indicates how evenly watermarks are distributed in a program, watermark embedding capacity indicates how much information can be embedded in the corresponding software, imperceptibility represents whether the presence of a watermark in software is perceptible, and efficiency indicates how much a software size or execution time increases after watermark embedding.

The main characteristics of a watermark cannot be maximized because they are sometimes in conflict, and thus need to be balanced. For example, the watermark embedding capacity tends to decrease when increasing imperceptibility, and vice versa.

CONTENT OF INVENTION

Problem to be Solved

In view of such circumstances, an object of the specification is to provide a new software watermarking method that meets requirements for software watermarking.

It is also an object of the present invention to provide a method of adding a watermark to a binary file without changing a source code and without recompiling the source code.

A method of embedding a watermark in software according to an embodiment of the specification includes generating an executable binary file by compiling a source code, and embedding a watermark into the executable binary file by rewriting the executable binary file while reordering two or more functions included in the executable binary file.

Means of Solving the Problem

A method of extracting a watermark from software according to another embodiment of the specification includes checking two or more functions included in a target executable binary file, recognizing positions or an order of the two or more functions, and extracting a watermark embedded in the executable binary file from the positions or the order.

A watermark embedding device according to another embodiment of the specification includes a compiler tool chain for generating an executable binary file and metadata including information related to positions of functions in the executable binary file by compiling a source code, a watermark embedder for embedding a watermark into the executable binary file by changing positions of two or more functions included in the executable binary file based on the metadata and rewriting the executable binary file by reflecting the change, and a ledger for storing information related to the changed positions and the metadata.

A watermark extraction device according to another embodiment of the specification includes a function identification unit for identifying two or more functions included in a target executable binary file, an order recognition unit for recognizing positions or an order of the two or more functions, a verification unit for extracting a watermark embedded in the executable binary file from the positions or the order, and a ledger for storing metadata including information related to positions of functions included in the executable binary file and function position information of the executable binary file rewritten by reflecting position-changed functions, wherein the verification unit compares the positions or order recognized by the order recognition unit with the function position information in the ledger to check whether there is matching function order information.

Effects of the Invention

It is possible to generate a binary file with watermark information embedded therein without changing a source code and without recompiling the source code, thereby reducing inconvenience in software creation, management, distribution, and the like.

Since the amount of data that can be embedded as a watermark increases and thus various types of information can be added to software, the function of the software can be maintained firmly even in the event of damage such as embedding, alteration, or deletion by a third party, and illegal leakage or copy can be tracked.

In addition, the time required to embed a watermark into software or the time required to extract the watermark is proportional to the size of the software or the size of watermark data to be embedded and thus it can be practically applied to software watermarking.

BRIEF DESCRIPTION OF THE DRAWINGS

FIG. 7 shows a table in which watermark data that can be embedded by a software watermarking method according to an embodiment of the specification is compared with data according to the Davidson-Myhrvold method.

SPECIFIC DETAILS FOR CARRYING OUT THE INVENTION

Figure 1:
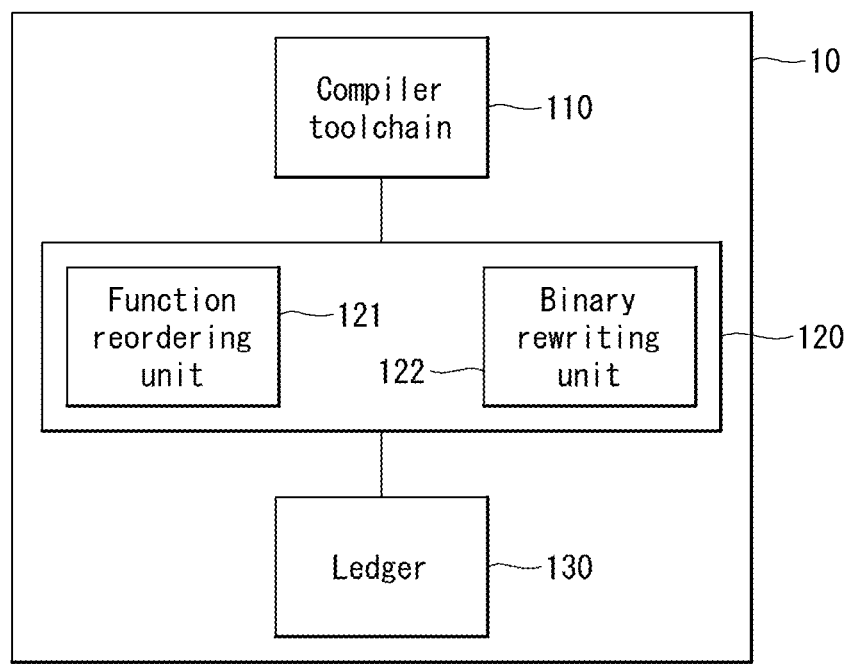
FIG. 1 conceptually illustrates a configuration of a device for embedding a watermark in software according to an embodiment of the specification.

Hereinafter, preferred embodiments of a software watermarking method and device according to the specification will be described in detail with reference to the accompanying drawings.

Like reference numbers throughout the specification indicate substantially the same elements. In the following description, a detailed description of known functions and configurations incorporated herein will be omitted when it may obscure the subject matter of the specification.

In many cases, conventional software watermarking is designed in such a manner that additional code or functions are embedded in a source and an executable binary is created to check watermarking later. Various researches on this method of embedding an additional structure, such as graph-based, obfuscation-based, and branch-based researches, have been conducted. For example, a watermark is identified in binary after defining and compiling a function that cannot be reached by a normal execution flow other than functions originally defined by a user.

This structure is very cumbersome and practically difficult because the source needs to be changed and recompiled every time a watermark is embedded, and version management by a developer needs to be performed individually.

Although there are techniques for directly changing an executable binary rather than a source code, in the case of a binary compiled by a compiler, a large amount of information (e.g., function boundaries, variable names, structures, function names, and the like) is lost and transformed, and thus there are limitations in recreating the binary.

For example, the method proposed by Davidson-Myhrvold is to reorder basic blocks (basic execution units in which instruction processing needs to be sequentially executed) within a function that can be identified. In this case, a large amount of watermark data can be added only when the number of basic blocks within a function increases, but in reality, software developers tend to perform programming such that the number of basic blocks within a function decreases, and thus the method proposed by Davidson-Myhrvold was not actually implemented.

Since the software watermarking method according to the specification does not change a source code, the source code is not recompiled, the executable binary is directly changed and regenerated by changing positions of functions in the compiled executable binary, and metadata generated at the time of compiling the source code can be used for information necessary to reorder the functions.

The inventor of the embodiments according to the specification published a paper related to technology called compiler-assisted code randomization (CCR) and actually implemented this technology in a low level virtual machine (LLVM) compiler infrastructure. According to the CCR, a compiler tool (e.g., a compiler and a linker) itself is changed. When a source code is compiled to generate an executable binary for the first time, metadata including information on positions of functions included in the source code, information on basic blocks included in the functions, information (Fixup) necessary to adjust the positions of the functions, a jump table that controls an execution flow, and the like is created and embedded into the executable binary, and then the positions of executable binary functions are arbitrarily changed using the metadata to achieve binary instrumentation or binary rewriting for a new executable binary without recompilation.

The CCR can identify functions and basic blocks included in source codes when an object file is created by compiling a plurality of source code files and generate metadata including information related to the identified functions and basic blocks, information for adjusting a position to which a program count will jump, and a jump table for controlling an execution flow at the time of linking a plurality of object files to generate an executable binary.

Using the metadata generated in this process, functions included in the compiled executable binary can be identified and code and data can be distinguished, and thus it is possible to rewrite the executable binary in accordance with function positions while changing the function positions without correcting or recompiling the source code.

Without metadata, it is difficult to accurately locate all functions in a compiled executable binary and distinguish between code and data included in the executable binary, and thus it is very difficult to create reliable, that is, executable binary files with the existing reversing technology.

According to an embodiment of the specification, it is possible to generate metadata while compiling a source code to generate an executable binary file, embed a watermark by reordering functions using the metadata to change the executable binary, and make function positions different for each executable binary file to be distributed by applying CCR to a software watermarking method. That is, different watermarks can be embedded for respective executable binary files, and watermarks added to the executable binary files or information related to recording of functions and metadata of the corresponding executable binary are managed in association with information on a user who has distributed the same in a ledger.

Then, it is possible to check whether an executable binary that is normally distributed or exposed to many through unknown paths has been altered using the information managed in the ledger, and if not, extract the watermark of the corresponding executable binary, that is, function reordering information and compare the same with the information managed in the ledger to confirm a first user. Alternatively, when the corresponding executable binary has been altered, it is impossible to extract the watermark in a normal process, but it is possible to increase the probability of identifying the first user by extracting some identification information through additional analysis.

Figure 2:
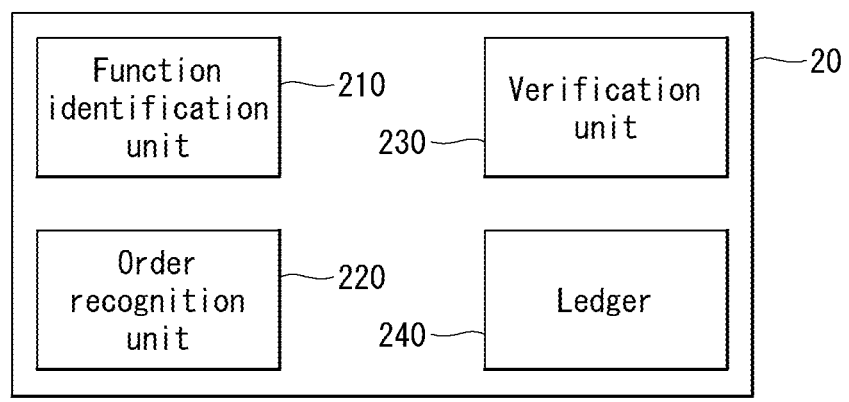
FIG. 2 conceptually illustrates a configuration of a device for extracting a watermark embedded in software according to an embodiment of the specification.

FIG. 1 conceptually illustrates a configuration of a device for embedding a watermark into software according to an embodiment of the specification and FIG. 2 conceptually illustrates a configuration of a device for extracting a watermark embedded in software according to an embodiment of the specification.

The watermark embedding device 10 according to the embodiment of the specification may include a compiler tool chain 110 that compiles a source code to generate a master binary including metadata and an executable binary, a watermark embedder 120 that embeds a watermark into the executable binary using metadata, and a ledger 130 for storing watermark information embedded in the executable binary.

The watermark embedder 120 may include a function reordering unit 212 that selects functions to be reordered from functions included in the executable binary and reorders the selected functions, and a binary rewriting unit 122 that rewrites the executable binary in response to the reordered functions.

The function reordering unit 121 may change the order of selected functions for each product even in the case of executable binaries for the same source code such that different watermarks can be embedded into products.

The ledger 130 may store the metadata generated by the compiler tool chain 110, functions selected and determined by the function reordering unit 121, and reordering information of the functions in association with the release number (Lot) of a rewritten executable binary product.

The watermark extraction device 20 may include a function identification unit 210 for identifying a function included in an executable binary to be verified, an order recognition unit 220 for recognizing the order of functions reordered and included in the executable binary, a verification unit 230 that extracts a watermark from the order of functions recognized by the order recognition unit 220 and compares the watermark with associated data stored in a ledger 240, and the ledger 240 storing metadata and function reordering information in association with each other, and the ledger 240 of the watermark extraction device 20 may operate in connection with the ledger 130 of the watermark embedding device 10.

The watermark extraction device 20 may not identify functions included in an executable binary to be verified when the executable binary is altered. In this case, some watermark identification information may be extracted by identifying functions through detailed analysis and comparing them with data stored in the ledger.

Figure 3:
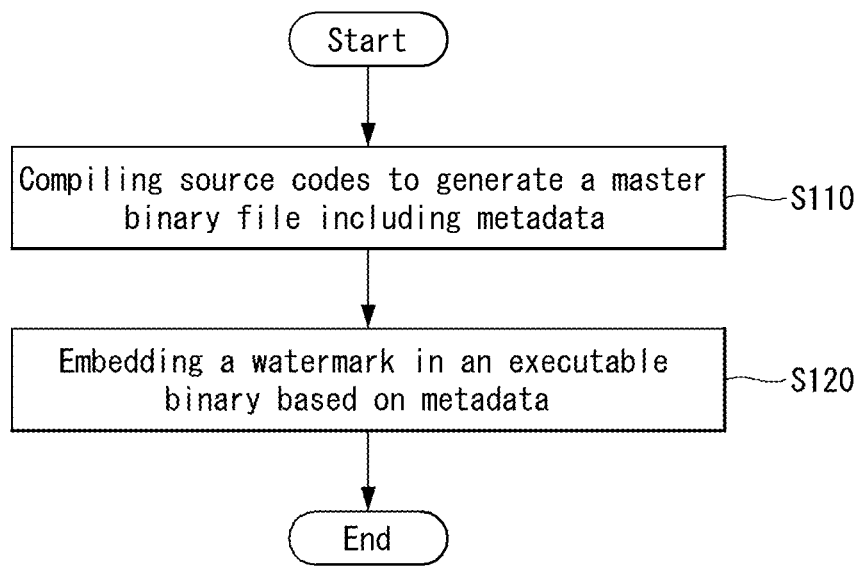
FIG. 3 is an operation flowchart of a method of embedding a watermark in software according to an embodiment of the specification.

FIG. 3 is an operation flowchart of a method of embedding a watermark into software according to an embodiment of the specification.

The compiler tool chain 110 of the watermark embedding device 10 compiles source codes using the CCR described above to generate a master binary file including metadata related to functions included in the source codes and an executable binary file (S110). The compiler tool chain 110 may check functions included in a source file while compiling one or more source codes and generating an object file and generate metadata including information related to a jump table that controls a program flow or information related to functions and basic blocks while linking the object file and generating an executable binary.

The watermark embedder 120 of the watermark embedding device 10 selects functions to be reordered in the executable binary using the metadata, reorders the selected functions, rewrites the executable binary in response to the reordered functions, and embeds a watermark into the binary file (S120).

Figure 4:
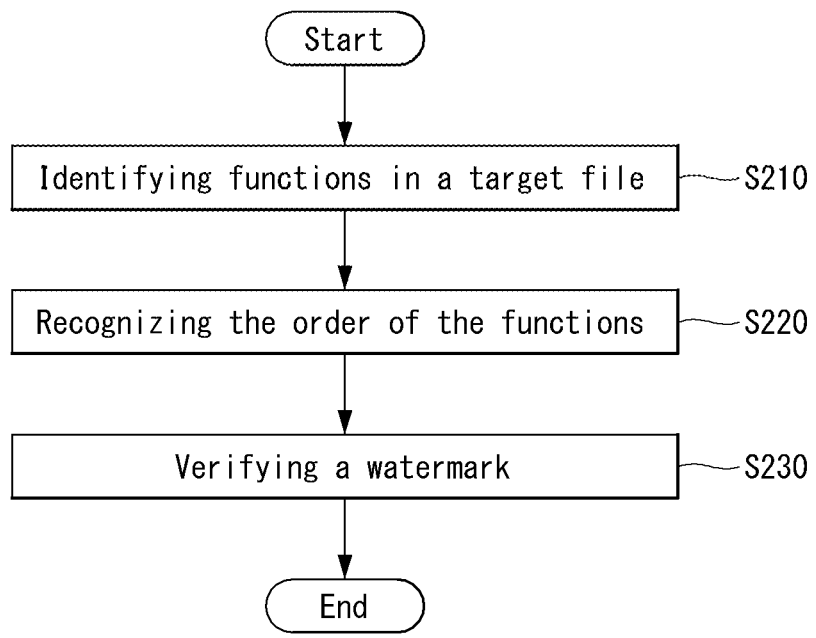
FIG. 4 is an operation flowchart of a method of extracting a watermark embedded in software according to an embodiment of the specification.

FIG. 4 is an operation flowchart of a method of extracting a watermark embedded in software according to an embodiment of the specification.

The watermark extraction device 20 detects metadata corresponding to a target executable binary to be verified in the ledger 240 and identifies functions included in the target executable binary based on the metadata (S210).

The watermark extraction device 20 analyzes the target executable binary to recognize the positions or order of the identified functions (S220). When the target executable binary has been altered, it may be difficult to ascertain the positions or order of the functions.

Thereafter, the watermark extraction device 20 may extract watermark information from the recognized order of functions and compare the watermark information with associated data stored in the ledger 240 to verify the release number of the executable binary (S230). That is, the watermark extraction device 20 may compare the recognized order of functions with a plurality of pieces of order information stored in the ledger 240 to find matching order information and verify the release number.

The watermark extraction device 20 may check functions and the positions of the functions through detailed analysis of the executable binary that has been altered and compare the same with data stored in the ledger to extract some watermarks, thereby checking the source of the corresponding binary.

Figure 5:
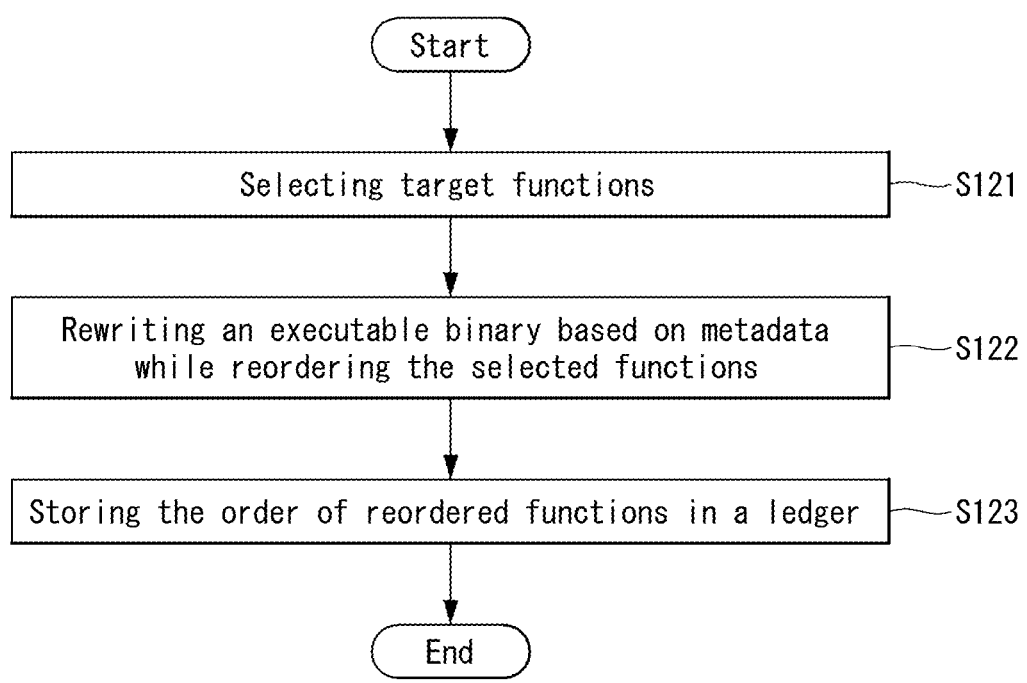
FIG. 5 is a flowchart illustrating an operation of generating a binary file in which a watermark has been embedded by changing the order of functions without compiling a source code.

FIG. 5 is a flowchart illustrating an operation of generating a binary file in which a watermark has been embedded by changing the order of functions without compiling a source code. The operation flowchart of FIG. 5 corresponds to step S120 of the operation flowchart of FIG. 3.

The watermark embedder 120 selects a plurality of functions from among functions included in an executable binary using metadata generated by the compiler toolchain 110 (S121). Further, the watermark embedder 120 may determine the number of functions in consideration of the amount of identification information to be embedded as watermarks into the executable binary and select the determined number of functions.

For example, if n functions are selected, n! different function orders, which correspond to log 2(n!) bits, can be obtained. According to Stirling's formula, log 2(n!) can be asymptotically calculated as $$\log_2\left(\sqrt{2\pi n}\left(\frac{n}{e}\right)^n\right).$$

That is, the number of bits that can be represented by n! is proportional to the number of functions. For example, according to the above formula, 100 functions can represent 524 bits.

The watermark embedder 120 reorders the selected functions and rewrites the executable binary according to the changed order using the metadata (S122).

Thereafter, the watermark embedder 120 stores order information of the reordered functions along with metadata in the ledger 130 in association with the product number of the corresponding executable binary (S123).

On the side in charge of production and maintenance of software, such software watermarking is performed, and metadata and function reordering information can be managed in a ledger in association with a generated software product number during creation of watermarked software.

When functions for smooth executable binary rewriting are selected and reordered, the following methods can be employed to prevent forgery or alteration.

First, although it is rare, two or more functions composed of the same instructions may be theoretically present, and thus functions that are not composed of the same instructions and do not overlap each other may be selected as candidates.

Second, functions having very small sizes are empirically likely to be composed of the same instructions, and thus they are not selected and are excluded as far as possible.

Third, if an attacker accidentally or intentionally obtains two or more instances, the attacker can ascertain the presence of a watermark. To prevent this, basic blocks within a function are also reordered.

Fourth, in case an attacker arbitrarily reorders functions, functions that are difficult to distinguish between code and data are selected in advance and must be included. While it is not 100% impossible for an attacker to create a fully functional executable binary by reordering functions using only a distributed executable binary without metadata, resources required to make this possible are not realistic.

Fifth, a plurality of watermarks are embedded in preparation for a situation in which one piece of watermark information is forged or altered.

Sixth, functions that do not belong to a function candidate group are randomly reordered.

Figure 6:
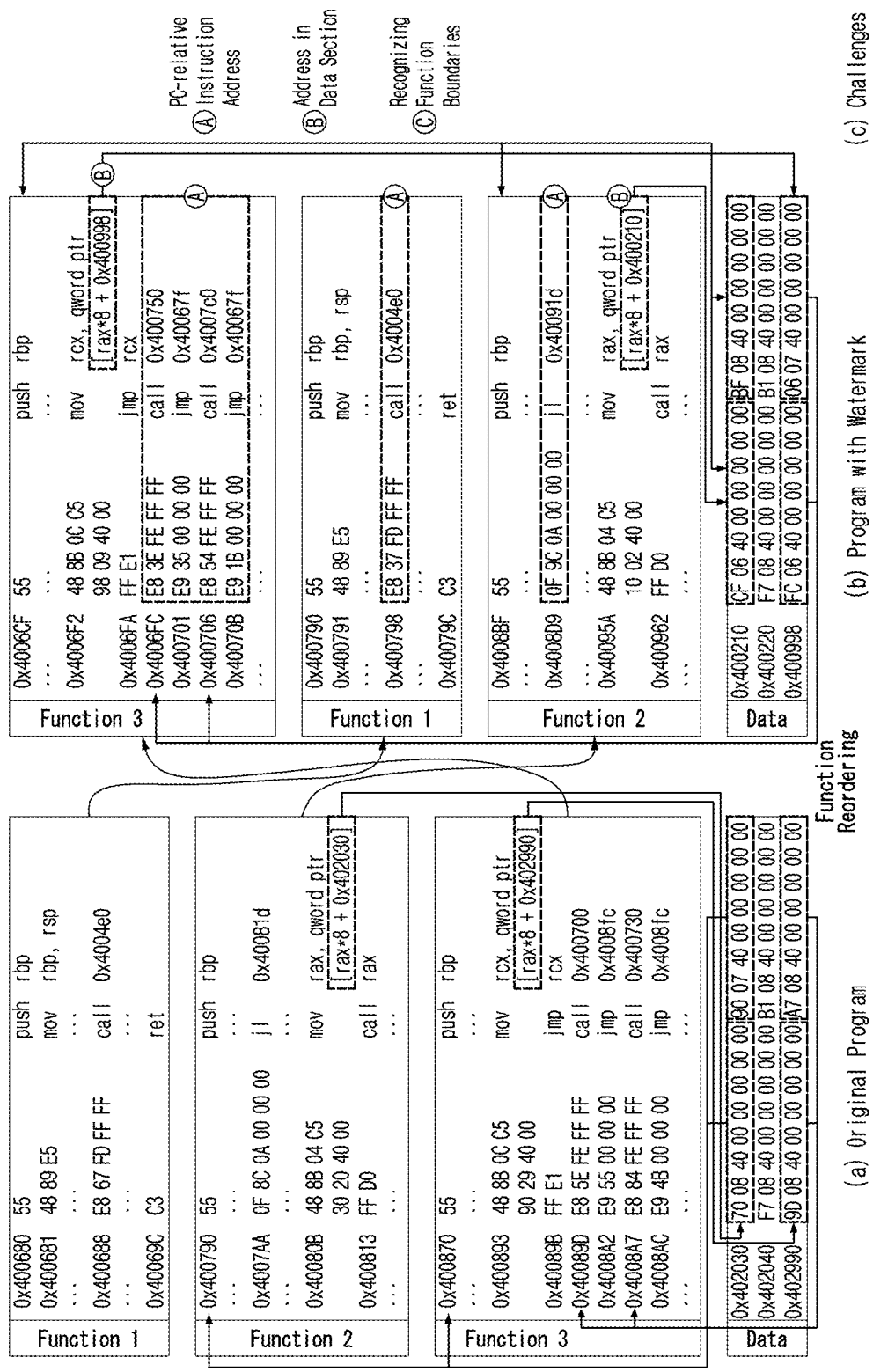
FIG. 6 illustrates an example of a binary file in which a watermark has been embedded by changing the order of functions.
Figure 8A:
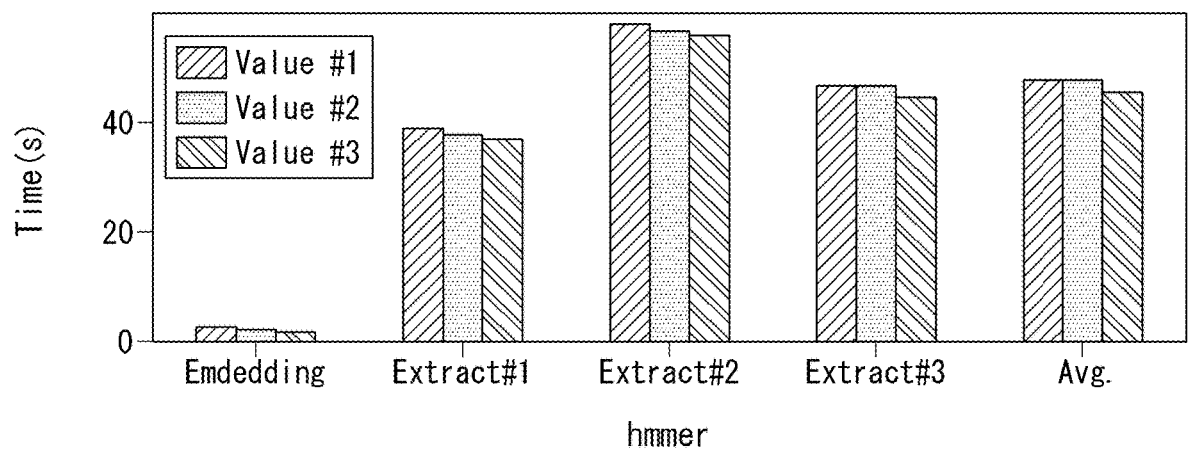
FIG. 8a to FIG. 8d show comparison of watermark embedding and extraction times for binary files of different sizes and watermark data of different values.
Figure 8B:
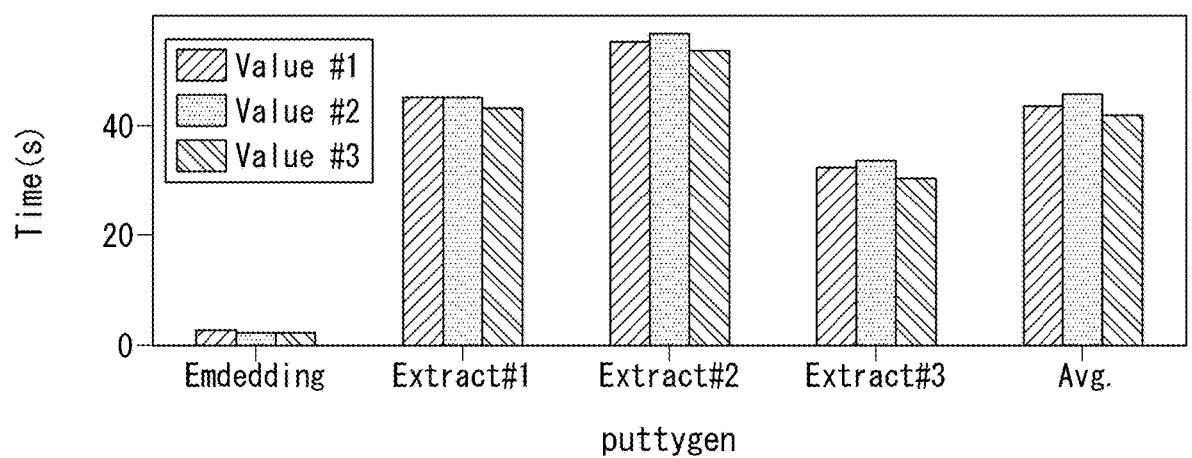
Figure 8C:
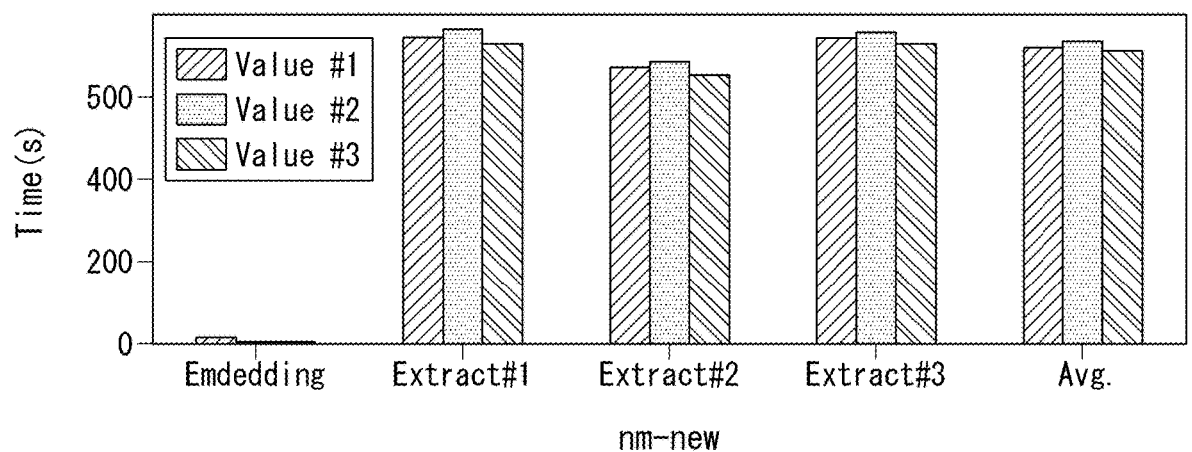
Figure 8D:
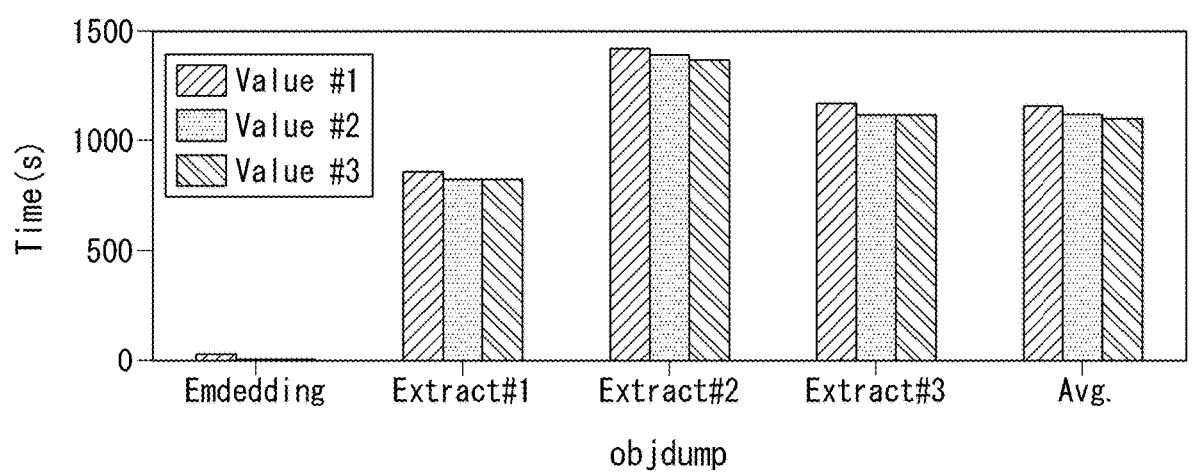

FIG. 6 illustrates an example of a binary file in which a watermark has been embedded by changing the order of functions.

In FIG. 6, (a) on the left is an original program, (b) on the right is a program with a watermark embedded therein, and (c) lists expected difficult items in the case of rewriting an executable binary without information such as actual metadata.

First, all addresses relative to a program counter (PC) must be updated. Second, addresses of a code pointer and the like in a data section must be updated after function reordering, but complete identification of data and code in an executable binary is undecidable. Third, it is difficult to completely identify a function boundary in an executable binary file without error.

However, according to the embodiment of the specification, it is possible to rewrite a compiled executable binary with credibility using metadata of a master binary by applying the CCR as a solution to the aforementioned problem.

FIG. 7 is a table in which watermark data that can be embedded by the software watermarking method according to the embodiment of the specification with data according to the Davidson-Myhrvold method.

Although the method proposed by Davidson-Myhrvold is to reorder basic blocks, it does not generate metadata for identifying functions or basic blocks at the time of compiling a source code unlike the embodiment of the specification, and thus an executable binary cannot be rewritten such that it is fully executable when basic blocks included in a complied executable binary file is reordered. On the other hand, the method according to the embodiment of the specification can use metadata for identifying functions included in a compiled executable binary, and thus can completely rewrite the executable binary (in an executable state) while reordering functions.

In addition, in the Davidson-Myhrvold method the amount of identification information that can be added to an executable binary as a watermark depends on a function including the largest number of basic blocks. On the other hand, in the method according to the embodiment of the specification, the amount of watermark information that can be added is proportional to the number of functions included in a source code.

In FIG. 7, the first column represents a program name, the second column represents a program size, the third column represents the number of functions included in the corresponding program, the fifth column represents the number of basic blocks of a function including the largest number of basic blocks among functions included in the corresponding program, the fourth column represents the number of bits of identification information that can be embedded as a watermark according to the embodiment of the specification, and the sixth column represents the number of bits of identification information that can be embedded as a watermark according to the Davidson-Myhrvold method.

As shown in the table of FIG. 7, the method according to the embodiment of the specification can add more identification information as a watermark than the Davidson-Myhrvold method.

FIG. 8a to FIG. 8d show comparison of watermark embedding and extraction times for binary files of different sizes and watermark data of different values. In FIGS. 8 to 11, times required to embed and extract watermarks having three different values for four different executable binaries are compared.

As shown in FIG. 8, since a time required to actually embed or extract a watermark is generally proportional to the size of an executable binary, the time can be estimated and it can be ascertained that the method of the embodiment of the specification is practical.

The software watermarking method according to the embodiment of the specification extracts information necessary for function reordering at the time of compilation, embeds the information into an executable binary to create an executable binary for reordered functions without recompiling the executable binary, and embeds a watermark. The core of this method is that the positions of functions included in a target program contain information necessary for a watermark. That is, the positions of a plurality of functions is 1:1 mapped to information.

Since traceability from a forensic point of view is provided through the software watermarking method according to the specification with respect to problems of illegal copying, problems of software illegal copying can be solved. That is, the watermarking method through function reordering in an executable binary can embed various types of information focusing on practicality and is designed to be robust against the threat of insertion, modification, and deletion by a third party other than the owner, allowing tracking of illegal leakage/copying.

The software watermarking method according to the embodiment of the specification has the following advantages without artificially inserting additional structures such as codes, blocks, or subroutines into software.

It is possible to reliably extract a watermark as necessary (credibility), to secure a watermark that is difficult to recognize outwardly (imperceptibility), to be robust against various attacks (robustness), and to have a sufficient capacity (capacity), to generate little performance overhead even after embedding information (efficiency), and to spread watermark information throughout a program (spread). In particular, it is possible to generate a static binary by embedding a watermark only with an executable binary itself without correcting and recompiling a source code. It is possible to defend against attempts to damage watermarks through a variety of strategies and solve the limitations of conventional approaches. In addition, it is possible to successfully embed and extract various watermark values through experimental results.

Various embodiments of the software watermarking method and device of the specification will be briefly and clearly described below.

A software watermarking method according to an embodiment includes generating an executable binary file by compiling a source code, and embedding a watermark into the executable binary file by rewriting the executable binary file while reordering two or more functions included in the executable binary file.

In one embodiment, the generating may further include generating metadata including information related to positions of functions in the executable binary file at the time of compiling the source code.

In one embodiment, the embedding may include rewriting the executable binary file by reflecting change in positions of the two or more functions using the metadata without recompiling the source code.

In one embodiment, the embedding may include selecting two or more functions included in the executable binary file using the metadata, changing positions of the selected two or more functions, and rewriting the executable binary file by reflecting change in the positions of the two or more functions based on the metadata.

In one embodiment, when a plurality of executable binary files are generated for the same source file, at least one executable binary file among the plurality of executable binary files may be compared with executable binaries other than the at least one executable binary file among the plurality of executable binary files, different functions may be selected and/or positions of the selected functions may be changed differently.

In one embodiment, the selecting may include selecting a number of functions determined in consideration of an amount of identification information to be embedded as the watermark.

In one embodiment, the selecting may include selecting two or more functions that are not composed of same instructions.

In one embodiment, the rewriting may further include changing positions of two or more basic blocks included in one or more of the selected two or more functions.

In one embodiment, the software watermarking method may further include storing information related to the changed function positions in association with the metadata.

A method of extracting a watermark from software according to another embodiment includes checking two or more functions included in a target executable binary file, recognizing positions or an order of the two or more functions, and extracting a watermark embedded in the executable binary file from the positions or the order.

In one embodiment, the checking may include checking the two or more functions using first metadata corresponding to the target executable binary file among one or more pieces of metadata stored to include information related to positions of functions included in executable binary files.

In one embodiment, the extracting may further include comparing the recognized positions or order with one or more pieces of function order information stored in association with the first metadata to check whether there is matching function order information.

A software watermarking device according to another embodiment includes a compiler tool chain for generating an executable binary file and metadata including information related to positions of functions in the executable binary file by compiling a source code, a watermark embedder for embedding a watermark into the executable binary file by changing positions of two or more functions included in the executable binary file based on the metadata and rewriting the executable binary file by reflecting the change, and a ledger for storing information related to the changed positions and the metadata.

A watermark extraction device according to another embodiment includes a function identification unit for identifying two or more functions included in a target executable binary file, an order recognition unit for recognizing positions or an order of the two or more functions, a verification unit for extracting a watermark embedded in the executable binary file from the positions or the order, and a ledger for storing metadata including information related to positions of functions included in the executable binary file and function position information of the executable binary file rewritten by reflecting position-changed functions, wherein the verification unit compares the positions or order recognized by the order recognition unit with the function position information in the ledger to check whether there is matching function order information.

The embodiments of the specification may be implemented in the form of program instructions that can be executed through various computer means and recorded in a computer-readable recording medium. The computer-readable recording medium may include program instructions, data files, data structures, and the like alone or in combination. The program instructions recorded in the medium may be specially designed and configured for the embodiments of the specification, or may be known and used by those skilled in the art of computer software. Examples of the computer-readable recording medium include a hard disk, magnetic media such as a floppy disc and a magnetic tape, optical recording media such as a CD-ROM, a DVD, and a BD, magneto-optical media such as a floptical disk, a ROM, a RAM, and a flash memory. Examples of program instructions include not only machine language code such as those generated by a compiler, but also high-level language code that can be executed by a computer using an interpreter or the like. A hardware device may be configured to operate as one or more software modules to perform operations of the embodiments of the specification, and vice versa.

Through the above description, those skilled in the art will know that various changes and modifications are possible without departing from the spirit of the present invention. Therefore, the technical scope of the present invention is not limited to detailed description of the specification, but should be defined by the claims.

EXPLANATION OF CODE

10: watermarking embedding device
20: watermark extraction device
110: compiler toolchain
120: watermark embedder
121: function reordering unit
122: binary rewriting unit
130, 240: ledger
210: function identification unit
220: order recognition unit
230: verification unit

The invention claimed is:
1. A method of embedding a watermark in software, comprising:

generating an executable binary file by compiling a source code and metadata including information related to positions of functions in the executable binary file at the time of compiling the source code; and embedding a watermark into the executable binary file by rewriting the executable binary file based on the metadata while reordering two or more functions included in the executable binary file.

2. The method of claim 1, wherein the embedding comprises rewriting the executable binary file by reflecting change in positions of the two or more functions using the metadata without recompiling the source code.

3. The method of claim 1, wherein the embedding comprises:

selecting two or more functions included in the executable binary file using the metadata;

changing positions of the selected two or more functions; and rewriting the executable binary file by reflecting change in the positions of the two or more functions based on the metadata.

4. The method of claim 3, wherein, when a plurality of executable binary files are generated for a same source file, at least one executable binary file among the plurality of executable binary files is compared with executable binaries other than the at least one executable binary file among the plurality of executable binary files, different functions are selected and/or positions of the selected functions are changed differently.

5. The method of claim 3, wherein the selecting comprises selecting a number of functions determined in consideration of an amount of identification information to be embedded as the watermark.

6. The method of claim 3, wherein the selecting comprises selecting two or more functions that are not composed of same instructions.

7. The method of claim 3, wherein the rewriting further comprises changing positions of two or more basic blocks included in one or more of the selected two or more functions.

8. The method of claim 2, further comprising storing information related to the changed function positions in association with the metadata.

9. A watermark embedding computer comprising:

a memory; and a processor configured to:

generate an executable binary file and metadata including information related to positions of functions in the executable binary file by compiling a source code;

embed a watermark into the executable binary file by changing positions of two or more functions included in the executable binary file based on the metadata and rewriting the executable binary file by reflecting the change; and storing information related to the changed positions and the metadata.

* * * * *